US007618580B2

(12) United States Patent
Coughlin et al.

(10) Patent No.: US 7,618,580 B2
(45) Date of Patent: Nov. 17, 2009

(54) METHOD FOR FABRICATION OF A POLYMERIC, CONDUCTIVE OPTICAL TRANSPARENCY

(75) Inventors: Christopher S. Coughlin, Leonardtown, MD (US); Raymond J. Meilunas, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 596 days.

(21) Appl. No.: 11/251,539

(22) Filed: Oct. 3, 2005

(65) Prior Publication Data

US 2007/0075462 A1 Apr. 5, 2007

(51) Int. Cl.
*B29C 47/00* (2006.01)
(52) U.S. Cl. .................... 264/465; 264/211.17
(58) Field of Classification Search ............. 264/465, 264/211.17
See application file for complete search history.

(56) References Cited

U.S. PATENT DOCUMENTS 4,758,464 A * 7/1988 Masuzawa et al. .......... 428/220
6,713,011 B2 3/2004 Chu et al.
7,094,367 B1 * 8/2006 Harmon et al. ............. 252/511
2003/0137083 A1 7/2003 Ko et al.
2004/0137225 A1 * 7/2004 Balkus et al. ............... 428/364

OTHER PUBLICATIONS

Bratcher, Matthew; Krauthauser, Carl; Gaddy, Gregory; and Deitzel, Joseph; Small Features Enable Big Results; Nanotechnology Research Uncovers for Future Army Systems (2004); AMPTIAC Quarterly, vol. 8, No. 4, pp. 107-110.*
M.J. Alam, D.C. Cameron, Optical and electrical properties of transparent conductive ITO thin films deposited by sol gel process, Thin Solid Films, 2000, pp. 455-459, vol. 377-378, Elsevier Science B.V.

* cited by examiner

*Primary Examiner*—Steven P Griffin
*Assistant Examiner*—Jacob Thomas Minskey
(74) *Attorney, Agent, or Firm*—Mark O. Glut

(57) ABSTRACT

A method for fabrication of an optical transparency, that includes electrospinning of an Indium Tin Oxide sol polymer solution such that nanofibers are formed, heat treating the electrospun nanofibers such that the Indium Tin Oxide is in a conductive form, and dispersing the heat treated nanofibers into a substantially optically clear polymer.

13 Claims, 2 Drawing Sheets

METHOD FOR FABRICATION OF A POLYMERIC, CONDUCTIVE OPTICAL TRANSPARENCY

STATEMENT OF GOVERNMENT INTEREST

The invention described herein may be manufactured and used by or for the Government of the United States of America for governmental purposes without payment of any royalties thereon or therefor.

BACKGROUND

The present invention relates to a method for the fabrication of an conductive optical transparency. More specifically, but without limitation, the present invention relates to the fabrication of a polymeric, conductive optical transparency system, especially for use in aircraft applications.

A transparency system is typically defined, but without limitation, as a system or apparatus that permits the passage of radiation. An optical transparency system is more specifically defined, but without limitation, as an optical system or apparatus that permits the transmittance of electromagnetic radiation in the visible wavelength range. In aircraft, a transparency system includes, but without limitation, canopies and windows. These systems must be highly durable and lightweight, specifically in military applications. Current U.S. Naval Aviation transparency systems are constructed of acrylic, polycarbonate or composites thereof, which often contain an imbedded conducting layer of either ultra thin gold or Indium Tin Oxide for electrostatic discharge protection and radar cross section reduction. The conducting layer needs to be ultra thin so as not to diminish the high optical transparency required in the canopy and/or window, as gold and Indium Tin Oxide are optical absorbers in bulk form. Typically, the transparency system is multilayered with numerous interfaces between unlike materials. Delamination (splitting into layers) frequently occurs at the metal film/polymer interfaces due to various environmental exposure effects while in service. This delaminated or debonded area acts as an optical scattering center, which degrades the optical transparency of the system. Delamination areas require costly repair or replacement of the aircraft transparency system (typically a canopy or a window). In the current state of the art, an Indium Tin Oxide thin film is applied to a polymeric substrate through a sputtering process. The resultant Indium Tin Oxide film is optically clear and conductive, but it must be further protected with a polymeric topcoat due to its poor environmental and abrasion resistance. The multiple interfaces between layers create areas of potential delamination that can lead to debond failures and subsequent degradation in optical transparency.

Thus, there is a need in the art to provide a method for fabrication of transparencies that incorporates the listed benefits without the limitations inherent in present methods.

SUMMARY

The present invention is directed to a method for fabrication of an optical transparency, that includes electrospinning of an Indium Tin Oxide sol polymer solution such that nanofibers are formed, heat treating the electrospun nanofibers such that the Indium Tin Oxide is converted into a conductive form, and dispersing the heat treated nanofibers into a substantially optically clear polymer.

It is a feature of the invention to provide a method to fabricate a transparency system that is more durable than currently used systems.

It is a feature of the invention to provide a method to fabricate a transparency system that minimizes large area interfaces, therefore minimizes potential delamination at these interfaces, especially in an aircraft environment.

It is a feature of the invention to provide a method to fabricate a transparency system that is both optically clear and electrically conductive.

BRIEF DESCRIPTION OF THE DRAWINGS

These and other features, aspects and advantages of the present invention will become better understood with reference to the following description and appended claims, and accompanying drawings wherein:

DESCRIPTION

Figure 1:
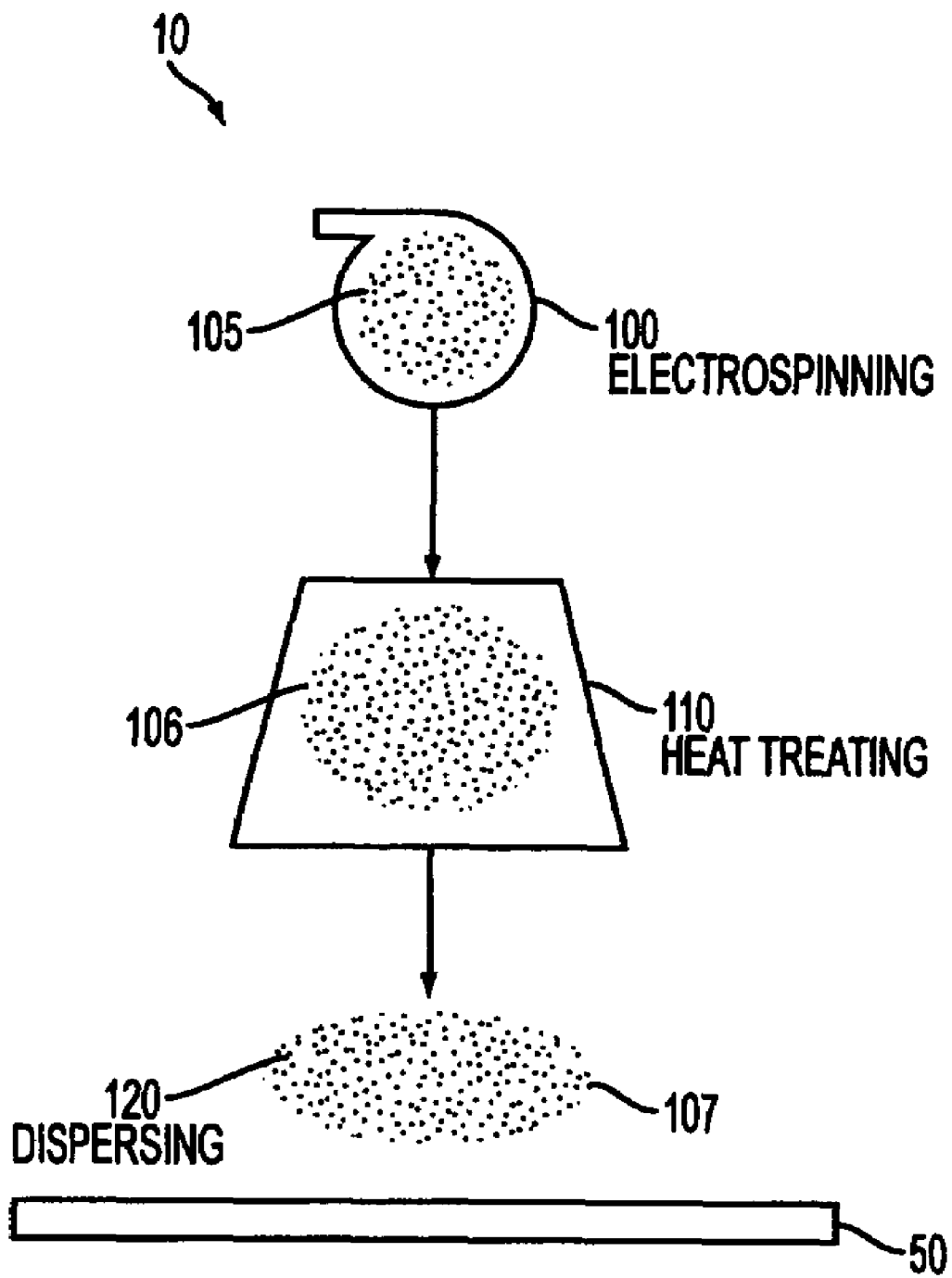
FIG. 1 is a schematic of an embodiment of the method to fabricate a transparency system.

The preferred embodiment of the present invention is illustrated by way of example below and in FIGS. 1-2. As seen in FIG. 1, an embodiment of the method for fabrication of a polymeric, conductive optical transparency 10, includes electrospinning 100 of an Indium Tin Oxide sol polymer solution 105 such that Indium Tin Oxide nanofibers 106 are formed, then heat treating 110 the electrospun nanofibers 106 such that the Indium Tin Oxide is converted into a conductive form, and then dispersing 120 the heat treated nanofibers 107 into a substantially optically clear polymer 50.

In the discussion of the present invention, the invention will be discussed in a military aircraft environment, particularly as applied to U.S. Navy aircraft; however, this invention can be utilized for any type of need that requires a transparency system.

The Indium Tin Oxide sol polymer solution 105 is prepared with an Indium Tin Oxide sol 201 and a carrier polymer 202. Indium Tin Oxide is indium oxide doped with tin oxide. Typically the molecular breakdown of Indium Tin Oxide is about 91% $In_2O_3$ and about 9% $SnO_2$. A sol may be defined, but without limitation, as a colloidal solution, or the liquid phase of a colloidal solution. The Indium Tin Oxide sol may be prepared by making two solutions and combining them. The method described in the reference "Optical and electrical properties of transparent conductive ITO thin films deposited by sol-gel process," by M. J. Alam, and D. C. Cameron, *Thin Solid Films*, vol. 377-378 (2000) pp. 455-459 may be utilized to combine the two solutions. (This reference is not admitted to be prior art with respect to the present invention by its mention in the description.)

The Indium Tin Oxide sol may be prepared in any manner practicable. As stated earlier, the Indium Tin Oxide sol may be prepared by making two solutions and combining them. In one of the embodiments, the first solution is made by dissolving indium trichloride in 2,4-pentanedione and refluxed at about 60° Celsius. The term reflux may be defined, but without limitation, as heating a liquid so that the vapors formed condense and return to liquid to be heated again. The second solution may be made by dissolving Anhydrous tin (IV) chloride in anhydrous ethanol. These two solutions are then combined to create a red-orange solution and stirred for at least one hour. In the preferred embodiment, the two solutions are combined when they are both at room temperature. Room temperature may be defined, but without limitation, as the temperature range of about 21° to about 25° Celsius (about 68° to about 77° Fahrenheit). The combined solution is the Indium Tin Oxide sol.

Figure 2:
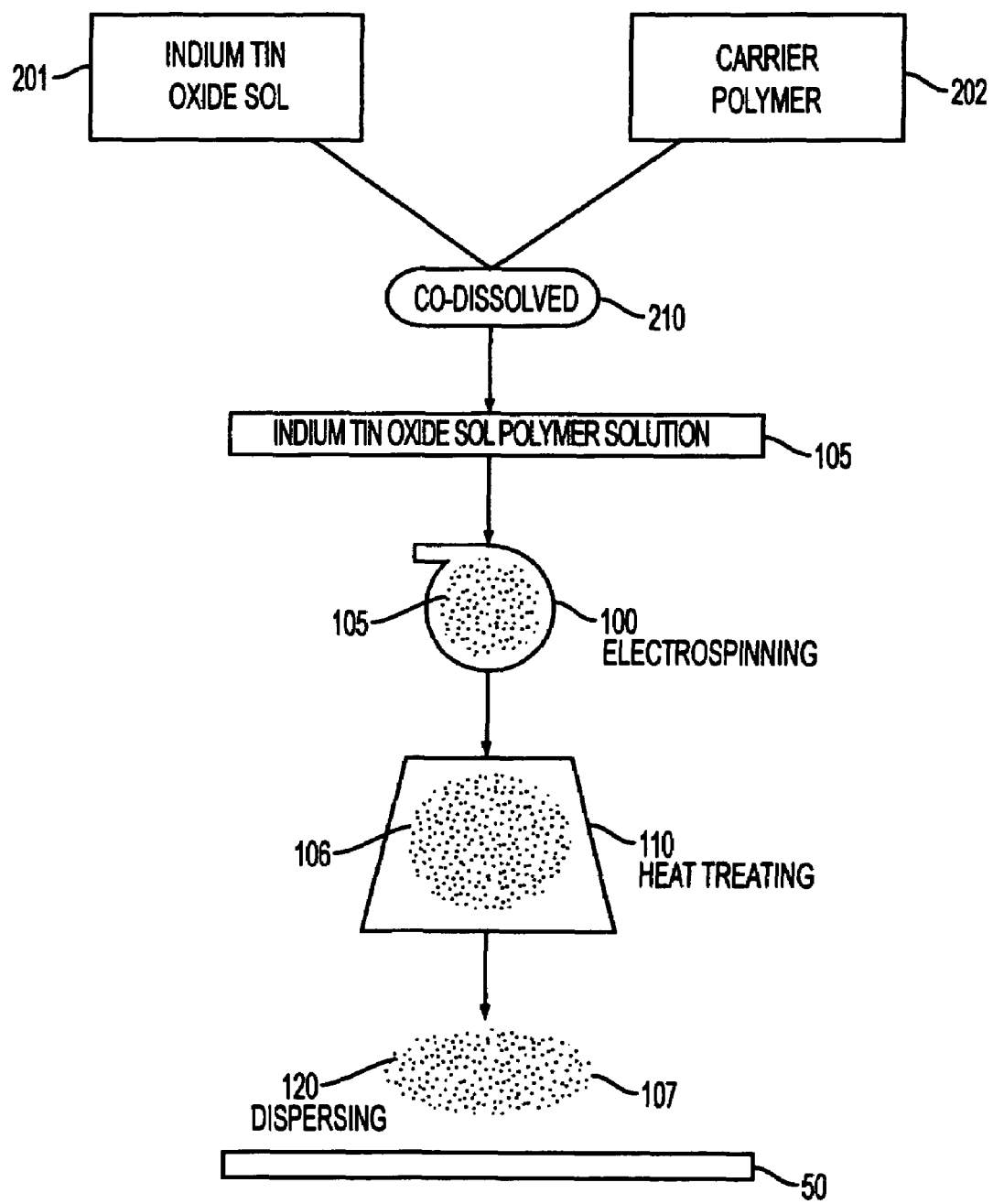
FIG. 2 is a schematic of another embodiment of the method to fabricate a transparency system.

As seen in FIG. 2, in an embodiment of the invention, the Indium Tin Oxide sol 201 is codissolved 210 with a carrier polymer 202 to create an Indium Tin Oxide sol polymer solution 105. For optimal results, the carrier polymer 202 may be an optically transparent clear polymer. Selection of the carrier polymer is important to assure the compatibility of the carrier polymer 202 and the Indium Tin Oxide sol 201, specifically, but without limitation, for electrospinning. For example, some charged polymers may complex with the Indium Tin Oxide sol 201 to create an insoluble substance that cannot be electrospun. Additionally, selection of the carrier polymer 202 is critical to the latter stages of the preparation where the polymer is removed during the heating process leaving the Indium Tin Oxide nanofibers. At the temperatures used in this process, some polymers will crosslink and char but remain essentially intact creating residue that will degrade the optical and electrical properties of the Indium Tin Oxide nanofibers. More desirably, there are other polymers that degrade through a mechanism termed unzipping where the polymer essentially depolymerizes to component monomers that are subsequently volatilized leaving little or no residue. For optimal results, it is recommended there is proper selection of the carrier polymer 202 to both enhance electrospinning of the Indium Tin Oxide sol while not degrading the final optical and/or electrical properties of the conductive optical transparency. The preferred carrier polymer 202 is poly(methyl methacrylate), commonly known as PMMA, because it is non-complexing to the Indium Tin Oxide sol 201, soluble in appropriate solvents and degrades at a relatively low temperature through an unzipping mechanism.

The preferred method of codissolving 210 is preparing a separate solution of the carrier polymer 202 in a solvent and combining this solution with the Indium Tin Oxide sol 201 with stirring. The separate polymer solution is prepared by adding solid polymer to the solvent of choice with stirring and heat, if necessary. In the preferred embodiment, the polymer is dissolved in the same solvent or solvent mixture as the Indium Tin Oxide sol 201. As discussed earlier, the solvent is 2,4 pentanedione and ethanol. However, other solvents may be used if they are miscible with the Indium Tin Oxide sol solvent and do not induce undesirable effects on the Indium Tin Oxide sol, such as for example precipitation. The concentration of polymer in the separate polymer solution is determined by the solubility and the resultant viscosity of the solution. In the preferred embodiment, poly(methyl methacrylate) with a molecular weight of about 350,000 is dissolved in the mixed solvent used in the Indium Tin Oxide sol of ethanol/2,4-pentanedione in the concentration range of about 15 to about 25%. Other molecular weights of poly (methyl methacrylate) may be used, but a different range of concentration may be necessary to achieve optimal results.

As seen in FIG. 2, the Indium Tin Oxide sol polymer solution 105 is then electrospun 100. Electrospinning is related to the electrospray atomization process (atomization may be defined as breaking up a liquid into a fine spray or fog) which exploits the interactions between an electrostatic field and conducting fluid. In electrospinning, the viscosity and surface tension of the solution are adjusted so that the stream does not break into separate particles, as in the electrospraying, but remains as a stream allowing the formation of extremely fine fibers or nanofibers. The preferred electrospinning methods are described in U.S. Pat. No. 6,713,011 issued to Chu et al. on Mar. 30, 2004, and U.S. Patent Application Publication 2003/0137083 by Ko et al. published Jul. 24, 2003. Neither reference is admitted to be prior art with respect to the present invention by its mention in the description. Both the aforementioned patent and published patent application are incorporated by reference herein.

In the preferred embodiment, the Indium Tin Oxide sol polymer solution 105 is electrospun using a field strength of about 130,000 V/m, collected on a conductive substrate, and then heat treated. The substrate may be any conductive material such as, but without limitation, aluminum. Depending on the electrospinning conditions, and substrate configuration, the electrospinning may create a nanofibril web of randomly oriented nanofibers or an assembly of roughly aligned nanofibers. The heat treatment removes both the solvent and the carrier polymer 202 (as well as any conductive substrate), and anneals the Indium Tin Oxide into a conductive phase. In the preferred embodiment, the nanofibers (or nanofibril web) are heat treated at about 240° Celsius in an oven for about 15 minutes followed by about a 450° Celsius anneal for about one hour. Other types of heat treatments may be utilized to yield conductive nanofibers. The nanofiber can then be infused or combined with a transparent polymer to create a clear conductive material suitable for use as a transparency material. In the preferred embodiment, this can be done by combining methyl mathacrylate monomer with the web of conductive nanofibrils/nanofibers. This monomer may be polymerized using standard techniques to create a composite of Indium Tin Oxide nanofibrils or nanofibers embedded in the methyl methacrylate fiber.

The electrospun nanofibers can be codeposited or dispersed throughout the thickness of the outer canopy acrylic layer eliminating any discrete area interface that would be susceptible to delamination. Though delamination might occur between the Indium Tin Oxide nanofiber surface and the optically clear polymer matrix for a percentage of Indium Tin Oxide nanofibers while in service, the nano dimensions of this interface would not lead to an optical scattering defect that would degrade the optical transmission of the transparent system over the visible wavelength range. Another transparent nanofiber material could be co-electrospun through the outer acrylic layer. The conductive nanofibers may also be embedded or dispersed through the entire thickness of the polymer and/or canopy.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment contained herein.

What is claimed is:

1. A method for fabrication of an optical transparency, comprising:

preparing an Indium Tin Oxide sol polymer solution;
wherein the method to prepare the Indium Tin Oxide sol polymer solution comprises:
dissolving indium trichloride in 2,4-pentanedione to create a first solution;
dissolving Anhydrous tin (IV) chloride in anhydrous ethanol to create a second solution;
combining the first solution and the second solution to create an Indium Tin Oxide sol;
codissolving the Indium Tin Oxide sol with a carrier polymer to create the Indium Tin Oxide sol polymer solution;

electrospinning of the Indium Tin Oxide sol polymer solution such that nanofibers are formed;
heat treating the electrospun nanofibers such that the Indium Tin Oxide is converted into a conductive form; and,
dispersing the heat treated nanofibers into a substantially optically clear polymer.

2. The method of claim 1, wherein the carrier polymer is a clear polymer.

3. The method of claim 1, wherein the carrier polymer is an optically transparent clear polymer.

4. The method of claim 1, wherein the carrier polymer is poly(methyl methacrylate).

5. A method for fabrication of a polymeric, conductive optical transparency, comprising:
preparing an Indium Tin Oxide sol polymer solution, the method of preparing the Indium Tin Oxide sol polymer solution comprising:
dissolving indium trichloride in 2,4-pentanedione to make a first solution;
dissolving Anhydrous tin (IV) chloride in anhydrous ethanol to make a second solution;
combining the first solution and the second solution to make an Indium Tin Oxide sol;
codissolving the Indium Tin Oxide sol with poly(methyl methacrylate) to produce the Indium Tin Oxide sol polymer solution;
electrospinning the Indium Tin Oxide sol polymer solution such tat nanofibers are formed;
annealing the electrospun nanofibers such that the Indium Tin Oxide is converted into a conductive form; and,
dispersing the annealed nanofibers into methyl methacrylate.

6. The method of claim 5, wherein the first solution and the second solution are combined at room temperature.

7. The method of claim 6, wherein the first solution and the second solution are stirred for about one hour.

8. The method of claim 7, wherein prior to combining the first solution and the second solution the first solution is refluxed at about 60° Celsius.

9. The method of claim 8, wherein the nanofibers are heat treated at about 240° Celsius in an oven for about 15 minutes followed by said annealing at about a 450° Celsius for about one hour.

10. The method of claim 9, wherein the Indium Tin Oxide sol polymer solution is electrospun using a field strength of about 130,000 V/m.

11. The method of claim 10, wherein the Indium Tin Oxide sol and the poly(methyl methacrylate) are codissolved by preparing a separate solution of the poly(methyl methacrylate) in a solvent and combining the separate solution of the poly(methyl methacrylate) and the solvent with the Indium Tin Oxide sol by stirring.

12. The method of claim 11, wherein the separate solution of the poly(methyl methacrylate) is prepared by adding solid polymer to a solvent of choice.

13. A method for fabrication of a polymeric, conductive optical transparency, comprising:
preparing an Indium Tin Oxide sol polymer solution, the method of preparing the Indium Tin Oxide sol polymer solution comprising:
dissolving indium trichloride in 2,4-pentanedion in to make a first solution;
dissolving Anhydrous tin (IV) chloride in anhydrous ethanol to make a second solution;
combining the first solution and the second solution to make an Indium Tin Oxide sol;
codissolving the Indium Tin Oxide sol with poly(methyl methacrylate) to produce the Indium Tin Oxide sol polymer solution;
electrospinning the Indium Tin Oxide sol polymer solution such that Indium Tin Oxide nanofibers are formed, the electrospinning performed at a field strength of about 130,000 V/m;
annealing the electrospun nanofibers such that the Indium Tin Oxide is converted into a conductive form; and,
dispersing the annealed nanofibers into methyl methacrylate fiber.

* * * * *